US006985173B2

United States Patent
Shan et al.

(10) Patent No.: US 6,985,173 B2
(45) Date of Patent: Jan. 10, 2006

(54) METHOD AND APPARATUS FOR OBTAINING INFORMATION FROM A UTILITY METER

(75) Inventors: Qing Shan, Leicestershire (GB); David Paul Ullathorne, Nottingham (GB); Stephen William Flowers, Leicestershire (GB)

(73) Assignee: Lattice Intellectual Property Ltd., London (GB)

( * ) Notice: Subject to any disclaimer, the term of this patent is extended or adjusted under 35 U.S.C. 154(b) by 194 days.

(21) Appl. No.: 10/398,204

(22) PCT Filed: Oct. 4, 2001

(86) PCT No.: PCT/GB01/04400

§ 371 (c)(1),
(2), (4) Date: Jul. 23, 2003

(87) PCT Pub. No.: WO02/31442

PCT Pub. Date: Apr. 18, 2002

(65) Prior Publication Data

US 2004/0032504 A1 Feb. 19, 2004

(30) Foreign Application Priority Data

Oct. 7, 2000 (GB) .................................... 0024612

(51) Int. Cl.
*H04N 7/18* (2006.01)

(52) U.S. Cl. ..................................... 348/160; 348/143
(58) Field of Classification Search ................ 348/160, 348/143; 382/100; 340/870.02
See application file for complete search history.

(56) References Cited

U.S. PATENT DOCUMENTS

| 5,559,894 | A | * | 9/1996 | Lubliner et al. | ............ 382/100 |
| 5,673,331 | A | * | 9/1997 | Lewis et al. | ................ 382/100 |
| 5,870,140 | A | * | 2/1999 | Gillberry | .................... 348/160 |
| 6,621,943 | B1 | * | 9/2003 | Yoo et al. | ................... 382/317 |
| 6,853,309 | B1 | * | 2/2005 | Schroter | ................ 340/870.02 |

FOREIGN PATENT DOCUMENTS

JP 11 175656 7/1999

* cited by examiner

*Primary Examiner*—Andy Rao
(74) *Attorney, Agent, or Firm*—Oblon, Spivak, McClelland, Maier & Neustadt, P.C.

(57) ABSTRACT

A method and apparatus for obtaining information from a utility meter. A digital camera is used to take a digital image of information displayed on the utility meter. The digital image is passed to a computer that is arranged to extract information displayed on the utility meter from the image. The information may be used for a variety of purposes such as updating databases with details of utility meters and for billing purposes.

10 Claims, 2 Drawing Sheets

METHOD AND APPARATUS FOR OBTAINING INFORMATION FROM A UTILITY METER

BACKGROUND OF THE INVENTION

1. Field of the Invention

The present invention relates to obtaining information from a utility meter.

2. Description of the Background

Information from utility meters is required for a number of purposes. For example, owners or operators of large numbers of meters such as gas, electricity or water companies generally keep a database of the number, location, type, age etc of their meters. In the past this information has been acquired by manually reading this information from newly installed and existing meters and manually entering this information into a database. However, the manual writing down of this information and subsequent manual entry into a database leads to a significant number of errors reducing the usefulness of the database. The amount of commodity measured by the meter is also displayed on a meter and collecting this information for billing purposes generally involves a person writing down the reading and later having it entered into a database. This also leads to human errors in the recording and transferring of many numbers.

SUMMARY OF THE INVENTION

An object of the present invention is the acquisition of information from a utility meter with a reduced risk of error.

According to a first aspect of the present invention there is provided a method of obtaining information from a utility meter, the method comprising using a digital camera to take a digital image of information displayed on the utility meter, passing the digital image to a computing means and using the computing means to obtain information from the image.

By using the computing means to obtain the meter information from the digital image there is a much lower risk of recording erroneous data. The information may be displayed on the meter as numbers, letters, words, barcodes, shapes or colours and the computing means can extract, interpret and store the information from the image. The digital camera is preferably a handheld digital camera to enable an operator to carry it easily from meter to meter and to enable the operator to take a clear picture of the information displayed on the meter.

The computing means may be a portable computer such as a so-called "laptop" or handheld computer. Such a computing means may also be carried around by an operator and connected to the digital camera so that as digital images are taken by the camera the image is passed directly to the computing means and the relevant information extracted from the image.

The extracted information is preferably stored by the computing means for later use.

Alternatively the digital camera may store a number of images and at a convenient time for the operator the images may be passed to a suitable computing means such as a computer in a van or at the operator's base. The relevant information can then be extracted from all of the stored images. The digital image may be passed from the camera to the computing means by a variety of methods. For example, the digital camera may be in communication with the computing means by an electrical cable or by a wireless link, using for example an infra red link or a mobile phone.

According to a second aspect of the present invention there is provided an apparatus for obtaining information from a utility meter, the apparatus comprising a digital camera to take a digital image of information displayed on the utility meter, computing means to receive the digital image taken by the digital camera and the computing means being arranged to extract information displayed on the utility meter from the image.

BRIEF DESCRIPTION OF THE DRAWINGS

An example of a method and apparatus illustrating the present invention will now be described with reference to the accompanying drawings in which.

DETAILED DESCRIPTION OF THE INVENTION

Figure 1:
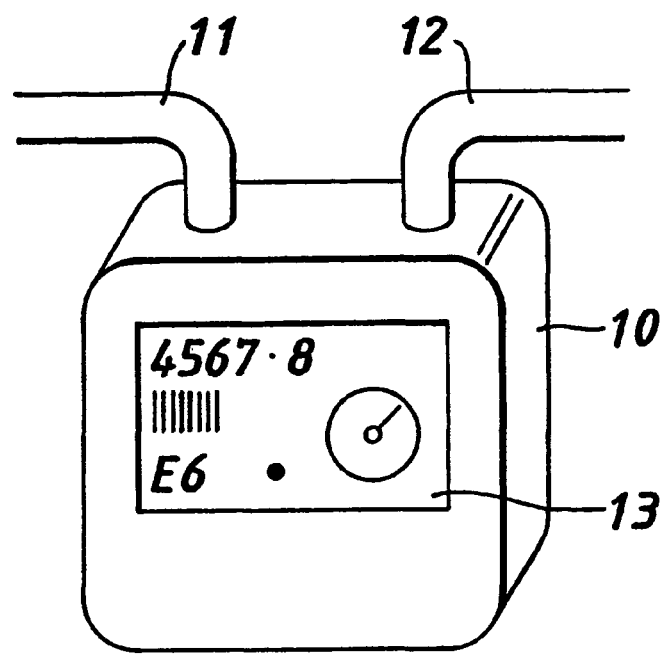
FIG. 1 shows an operator taking a digital image of a utility meter.
Figure 1:
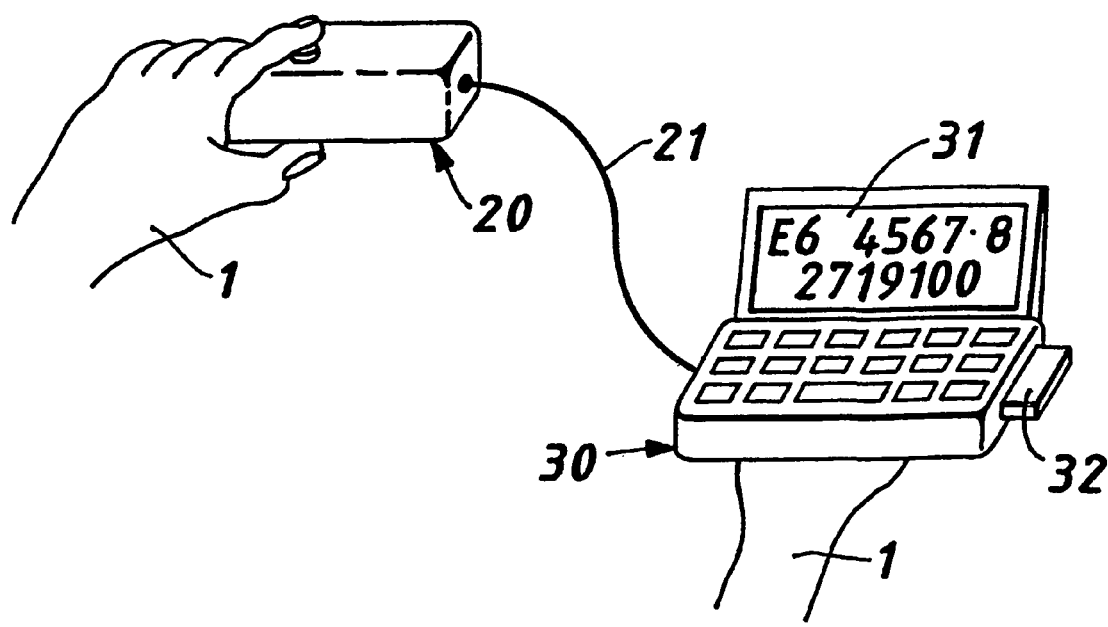

As shown in FIG. 1, a utility meter 10 which in this example is a gas meter has an input pipe 11, an output pipe 12 and a meter index plate 13. The meter index plate 13 displays a variety of information such as the meter manufacturer, year of manufacture, meter reference number, meter reading and information about the construction of the meter. This information is displayed in a variety of forms including numbers, letters, barcodes, colours and shapes. The operator 1 takes a digital image of the meter index plate 13 using a digital camera 20. Any conventional digital camera 20 will be suitable such as those made by Kodak or Panasonic (trade marks). The digital image from camera 20 is then passed through cable 21 to computing means 30 which in this case is a handheld portable computer with a screen 31. The computer 30 is arranged to identify relevant information from the image and store it. Any known software package may be used to identify the relevant information from the digital image such as LabView Vision or C++. The operator may enter the type of meter to be analysed into the computing means 30. The computing means 30 may then select a template suitable for the meter index plate 13 of the meter to be read which defines the relevant positions of various desired pieces of information on the meter index plate 13. The computing means may position and size the template over the image based on two or more reference positions read from the image. Information obtained from the image may then be stored within the computer or on a removable storage means such as a disc 32 shown inserted into the computer 30 or may be transmitted to a remote location using, for example, a mobile telephone.

Alternatively the digital camera may be used to take and store a number of images of meter index plates 13 which are then passed to a computer 30 together at a convenient opportunity. The computer need not be connected to the camera whilst the images are taken and the computer could be kept at a convenient remote location such as the operator's vehicle or base.

In either case the images could be sent to the computer 30 by any convenient means such as a communication cable 21, infra red communication link or as a radio signal using a mobile telephone for example.

Figure 2:
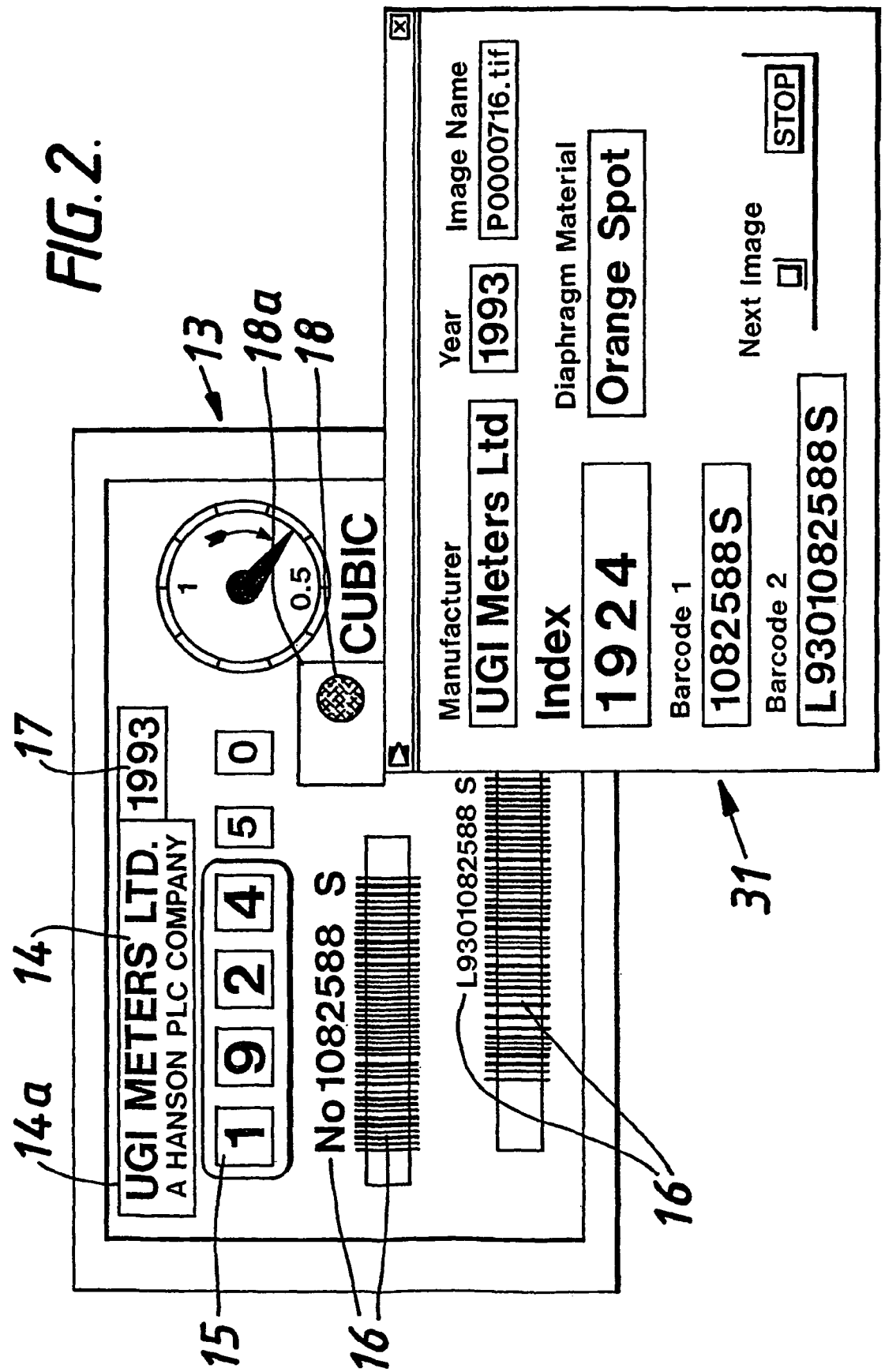
FIG. 2 shows the information displayed on the meter index plate and the corresponding information extracted from the digital image.

FIG. 2 shows an example of a meter index plate 13 and the extracted information from the meter index plate 13 displayed on a computer screen 31. As can be seen, information is displayed on the meter index plate 13 in the form of letters, numbers, bar codes and shapes which can be various colours. The computer 30 analyses the digital image and extracts desired information which can then be stored and displayed. Information in the form of bar codes, shapes and colours can be converted into their corresponding alphanumeric meaning.

In the present example the operator 1 visually identifies the type of meter to be analysed. This information is stored in association with the image. Knowing the type of meter, the computer 30 selects a suitable template which identifies the location of various pieces of information on the image of that identified meter index plate 13 such as the manufacturer 14, meter index reading 15, meter reference numbers and bar codes 16, year of manufacture 17 and coloured shapes 18. Since the size of the meter index plate 13 in the image can vary depending upon how close the camera is to the index plate 13 when taking the image and the position of the index plate 13 can be anywhere in the image, the computer identifies at least two reference points on the image. For example, for the meter index plate 13 of FIG. 2 these points could be the top lefthand corner of the box containing the manufacturer 14a and the top righthand corner of the box containing the coloured shape 18a. However, of course, any two points which are always at the same positions on the meter index plate 13 will be suitable. These two points will be a known distance apart and at known locations relative to the desired information. Upon identifying these two points the computer calibrates the image by scaling it to an appropriate standard size and positioning it to accommodate the template. The desired information is then read from the calibrated image and stored or presented on the computer screen 31. The collected information may be used for any suitable purpose such as for updating data bases or for supplying bills.

Many modifications may be made to the example described without departing from the invention. For example, the computer 30 could be connected directly to the digital camera 20 or they could be separate and the images passed from the camera 20 to the computer 30 when convenient. Furthermore, information could be read from any type of utility meter such as an electricity or water meter as well as the gas meter described in the example.

What is claimed is:

1. A method of obtaining information from a utility meter, the method comprising using a digital camera to take a digital image of information displayed on the utility meter, passing the digital image to a computing means and using the computing means to extract information displayed on the utility meter from the image, wherein the computing means extracts information displayed on the utility meter from the image by calibrating the image, and wherein the step of calibrating the image comprises identifying two points in the image, the two points being points on two different features within the image and which correspond to points which are at known relative positions on the utility meter.

2. A method according to claim 1, wherein the information extracted from the image is stored.

3. A method according to claim 1, wherein the information extracted from the image relates to the amount of commodity measured by the meter.

4. A method according to claim 1, wherein the information extracted from the image identifies the particular meter in the image.

5. A method according to claim 1, wherein a handheld portable digital camera is used to take a digital image of information displayed on the utility meter.

6. A method according to a claim 1, wherein the computing means is connected to the digital camera when the digital image of information displayed on the utility meter is taken.

7. A method according to claim 1, wherein the digital camera is not connected to the computing means when the digital camera is used to take an image of the information displayed on the utility meter.

8. A method according to claim 7, wherein a plurality of images are taken with the digital camera and the camera then communicates with the computing means to pass the digital images to the computing means.

9. An apparatus for obtaining information from a utility meter, the apparatus comprising a digital camera to take a digital image of information displayed on the utility meter, computing means to receive the digital image taken by the digital camera and the computing means being arranged to extract information displayed on the utility meter from the digital image, wherein the computing means is operable to extract information displayed on the utility meter from the image by calibrating the image, said calibrating comprising identifying two points in the image, the two points being points on two different features within the image and which correspond to points which are at known relative positions on the utility meter.

10. An apparatus according to claim 9, wherein the digital camera is a handheld portable digital camera.

* * * * *